United States Patent
Meissner et al.

(10) Patent No.: US 9,612,312 B2
(45) Date of Patent: Apr. 4, 2017

(54) FLIGHT GUIDANCE SYSTEM

(75) Inventors: Ute Marita Meissner, Cologne (DE); Klaus-Uwe Hahn, Wendeburg (DE)

(73) Assignees: Deutsches Zentrum fuer Luft- und Raumfahrt e. V., Cologne (DE); Frau Ute Marita Meissner, Cologne (DE)

( * ) Notice: Subject to any disclaimer, the term of this patent is extended or adjusted under 35 U.S.C. 154(b) by 143 days.

(21) Appl. No.: 13/989,429

(22) PCT Filed: Nov. 25, 2011

(86) PCT No.: PCT/EP2011/071027
§ 371 (c)(1),
(2), (4) Date: Aug. 7, 2013

(87) PCT Pub. No.: WO2012/069629
PCT Pub. Date: May 31, 2012

(65) Prior Publication Data
US 2013/0306800 A1    Nov. 21, 2013

(30) Foreign Application Priority Data
Nov. 26, 2010  (DE) ........................ 10 2010 052 474

(51) Int. Cl.
*G01S 5/02* (2010.01)
(52) U.S. Cl.
CPC ................ *G01S 5/02* (2013.01); *G01S 5/021* (2013.01); *G01S 5/0247* (2013.01)
(58) Field of Classification Search
CPC .... G01S 5/0009; G01S 5/0018; G01S 5/0027; G01S 5/0036; G01S 5/0045;
(Continued)

(56) References Cited

U.S. PATENT DOCUMENTS 3,047,861 A    7/1962 Arnold et al.
3,146,448 A    8/1964 Shelley
(Continued)

FOREIGN PATENT DOCUMENTS

DE         2459079 A1    7/1975
DE       43 15 863 A1   11/1993
(Continued)

*Primary Examiner* — Brian M O'Hara
(74) *Attorney, Agent, or Firm* — Whitham, Curtis & Cook, P.C.

(57) ABSTRACT

The invention relates to a flight guidance system for the flight support of a aircraft (1), said system comprising a plurality of fixed ground stations (4a to 4e) respectively comprising a transmitting and/or receiving unit (5a to 5e), and at least one transmitting and/or receiving unit (6) that is arranged on the aircraft (1), the transmitting units being act up to send position signals (7) and the receiving units being set up to receive said position signals (7). The flight guidance system comprises at least one position determination unit (9, 10) that is connected to at least some of the transmitting and/or receiving units (5a to 5e, 6, 6a to 6c) and set up to determine locations of the transmitting and/or receiving unit (6) arranged on the aircraft, according to the position signals (7) that are sent by the fixed transmitting units and received by the at least one receiving unit arranged on the aircraft and/or sent by the at least one transmitting nail arranged on the aircraft and received by the fixed receiving units. The flight guidance system is designed for flight support of the aircraft according to the determined locations.

11 Claims, 2 Drawing Sheets

(58) Field of Classification Search
CPC ...... G01S 5/0054; G01S 5/0063; G01S 5/009; G01S 5/0247; G05D 1/0676
See application file for complete search history.

(56) References Cited

U.S. PATENT DOCUMENTS

| | | |
|---|---|---|
| 3,795,911 A | 3/1974 | Hammack |
| 3,952,308 A | 4/1976 | Lammers |
| 5,017,930 A | 5/1991 | Stoltz et al. |
| 5,235,513 A * | 8/1993 | Velger .................. G01S 1/70 244/183 |
| 5,583,513 A | 12/1996 | Cohen |
| 6,469,654 B1 | 10/2002 | Winner |
| 2003/0122666 A1 | 7/2003 | John et al. |
| 2004/0220722 A1 | 11/2004 | Taylor |
| 2007/0040734 A1 | 2/2007 | Evers |
| 2008/0269988 A1 | 10/2008 | Feller |

FOREIGN PATENT DOCUMENTS

| | | |
|---|---|---|
| DE | 601 06 446 T2 | 2/2006 |
| EP | 0385600 A2 | 9/1990 |
| FR | 2759163 A1 | 8/1998 |
| FR | 2836554 A1 | 8/2003 |
| WO | 98/02762 A2 | 1/1998 |

\* cited by examiner

FLIGHT GUIDANCE SYSTEM

FIELD OF THE INVENTION

The invention relates to a flight control system for flight assistance of a flying object. The invention likewise relates to a method for this purpose.

BACKGROUND

Among the most critical phases during a flight are the landing and the take-off. During landing, it is of critical importance that the position of the aircraft and the sink rate are matched to one another such that the aircraft touches down at a predefined position on the runway, referred to as the nominal touch-down point, such that the pilot has sufficient freedom to allow the aircraft to wheel out and to brake it down to the taxiing speed. Discrepancies of several meters to the left or to the right and excessively early contact with the ground lead to the aircraft leaving the runway and having an accident. In contrast, if the aircraft touches down too late, then there is a risk that it will no longer be possible to brake the aircraft down to the taxiing speed and that the aircraft will roll on the runway, likewise meeting with an accident.

While the pilot can land the aircraft safely in visual flight in good weather and visibility conditions, additional systems, which assist the pilot during the landing, are required in particular in poor weather conditions, for example in fog or in the dark. In this case, systems such as these are used to indicate a path to the touch-down point on the runway threshold to the pilot, which he cannot estimate himself because of the external weather conditions.

By way of example, the ILS (instrument landing system) has been known since the 1920s, with this being a ground-based landing system and assisting the pilot during the landing process, in particular in poor weather conditions. In this case, two electromagnetic guide beams are used to indicate the course which the aircraft must follow in order to touch down safely on the runway. A corresponding receiver is located on board the aircraft, which receives the electromagnetic signal and indicates the appropriate course for the pilot visibly on a display. A further landing system, which was developed in the 1980s, is the MLS (microwave landing system). The system transmits a beam, which is deflected horizontally and vertically in time, into the approach area of the aircraft.

In addition to the two landing systems mentioned above, satellite navigation systems are also used in addition in good visibility conditions nowadays, in order to allow the location position of the aircraft to be determined in three dimensions, with this beam also being included in the landing process. Satellite navigation systems such as GPS (Global Position System), GALILEO, or GLONASS are, however, in general accurate only to a few meters (one to three meters). This error component can admittedly be corrected to an extent with the aid of DGPS (Differential GPS), by transmitting an appropriate correction signal based on the signal measured by a nearby DGPS ground station. However, even this does not achieve the accuracy which is required to allow an aircraft to touch down precisely on the runway threshold. This is because an accuracy of a few centimeters is required for this purpose, since, otherwise, it is not possible to determine the height of the aircraft above ground sufficiently accurately. A further disadvantage is the excessively low clock rate with which the signals are refreshed and which in consequence cannot provide continuous information.

Furthermore, the use of satellite navigation systems is subject to the disadvantage that the legal position of the operator is problematic. In the event of a failure or a fault, the legal question therefore remains as to who is responsible for the resultant damage. In addition, at the moment, satellite navigation systems are not licensed for landing assistance in poor visibility (ICAO-CATIII).

For example, U.S. Pat. No. 6,469,654 B1 discloses a transponder landing system, in which a transmitting unit which is arranged on the ground transmits a signal to the aircraft. This signal is then identified by a transponder, as is required for secondary radar, and is transmitted back, with the signal which is transmitted back being received by a plurality of receivers which are arranged on the ground. The range is then determined on the basis of the signal delay time, and the position of the aircraft can be deduced in this way. U.S. Pat. No. 5,017,930 also discloses a similar system.

However, the considerable disadvantage of both systems is that the processing speed of the transponder is not known, as a result of which this is still unknown when determining the signal delay time which, in the end, leads to increased inaccuracy in the determination of the range.

SUMMARY

The object of the present invention is therefore to specify an improved flight control system which assists flight control even in poor visibility conditions, based on a high-precision location position of the aircraft.

The object is achieved by the flight control system mentioned initially for flight assistance of a flying object having a plurality of stationary ground stations, which each have a transmitting and/or receiving unit, and having at least one transmitting and/or receiving unit which is arranged on the flying object and is fixed to the object, with the transmitting unit being designed to transmit position signals, and with the receiving unit being designed to receive these position signals, and with the flight control system having at least one position determination unit which is connected to at least some of the transmitting and/or receiving units and is designed to determine location positions of the transmitting and/or receiving unit which is fixed to the object, as a function of the position signals which were transmitted by the stationary transmitting units and were received by the at least one receiving unit which is fixed to the object, and/or which were transmitted by the at least one transmitting unit which is fixed to the object and were received by the stationary receiving unit, with the flight control system being designed for flight assistance to the flying object as a function of the determined location positions.

In order to avoid the disadvantages known from the prior art, the present invention proposes a flight control system which has a plurality of stationary ground stations. The stationary ground stations are in this case arranged at a distance from one another in the relatively close vicinity of the runway or of the airport, and have appropriate transmitting and/or receiving units, which can be used to transmit and receive position signals. A flying object which wishes to land at this airport or take off from it and in the process wishes to use this flight control system for assistance likewise has at least one transmitting and/or receiving unit which is arranged fixed to the flying object. Both the stationary transmitting units and the transmitting units which are fixed to the object are in this case designed to transmit position signals, while both the receiving units which are fixed to the object and those which are stationary are designed to receive these transmitted position signals.

Furthermore, the flight control system has a position determination unit which determines the high-precision location position of the transmitting and/or receiving unit which is fixed to the object, as a function of the received position signals, and can therefore, for example, assist the landing of the flying object on the basis of this high-precision location position.

The use of this system is particularly advantageous for carrying out a precise landing approach.

In a first alternative, the position determination unit is arranged on the flying object and is connected to the receiving unit which is fixed to the object such that the position signals which are received by the receiving unit, and the information which can be derived therefrom, can be passed on to the position determination unit. In this case, the ground stations have corresponding transmitting units, which transmit these position signals in order that the flying object can autonomously determine its position on its own.

In a second alternative, the position determination unit is connected to the receiving units which are arranged at the ground stations and are fixed to the object, while a corresponding transmitting unit for transmission of position signals is arranged on the flying object. When the receiving units, which are at a distance from one another, now receive this position signal which is transmitted by the flying object, this is then passed on to the position determination unit, from which the position of the flying object can then be calculated. In this alternative, it is possible for the airport operator to be able to determine the position of the flying object "in-house" independently of other technical equipment, such as radar.

In a third alternative, the stationary ground stations, which are arranged at a distance from one another, each have a transmitting and a receiving unit, while at least one transmitting and receiving unit is likewise arranged on the flying object. Furthermore, the stationary receiving units are each connected to a position determination unit which, for example, can be accommodated in the tower of the airport, while a position determination unit is likewise arranged on the flying object and is connected to the receiving unit there. Therefore, in this alternative, the position of the flying object can be determined mutually independently both by the aircraft and by the airport, which considerably simplifies failsafety and fault diagnosis, as will also be described further below.

In all three alternatives, the flight assistance to the flying object is then provided with the aid of the flight control system on the basis of the determined high-precision location position, for example such that the flying object can land safely on the runway manually or with the aid of the autopilot, even in poor visibility conditions. This is because the assistance of this system makes it possible to determine the position of the aircraft sufficiently accurately that the height of the aircraft can also be determined accurately. Safe control of the aircraft on a nominal flight path and a safe touchdown on the runway threshold are possible only with an appropriately accurate indication of the height above ground.

For example and by way of advantage, if two or more transmitting and/or receiving units which are arranged at a distance from one another, for example for redundancy purposes, are arranged on the flying object, then it is particularly advantageous for the location position to be determined for each of the transmitting and/or receiving units which are fixed to the object, in which case the spatial attitude of the flying object can then be derived from the individual location positions. For example, if the transmitting and/or receiving units are each arranged at the wing tips and at the front or rear part of the flying object, and if the relative position of these transmitting and/or receiving units with respect to one another is known, then the spatial attitude of the aircraft can be calculated from the location positions of the individual transmitting and/or receiving units, and can then be used in an advantageous manner to assist the landing of the flying object at the airport.

In this case, the position signals are always either transmitted from a stationary transmitting unit to a receiving unit which is fixed to the object, or from a transmitting unit which is fixed to the object to a stationary receiving unit, in which case, for example, appropriate synchronization of the clocks both in the transmitting units and in the receiving units is necessary in order to measure the signal delay time. By way of example, this can be done by a simple reference clock, because the signal delay times to the transmitters and from the receivers via their associated cable lengths are known, and/or can be harmonized via identical cable lengths or via electronic means.

For example, in order to determine the location position of the transmitting and/or receiving unit which is fixed to the object, it is feasible for this to be done as a function of a signal delay time of the position signals which were transmitted by the transmitting units. The location position of the flying object can be determined with high precision with the assistance of the location position of the stationary ground stations, which can be determined with high precision in advance, and which is known by the position determination unit. Even when using four stationary ground stations and when four position signals are in each case transmitted at different positions and a position signal is received at four different positions, the location position of the receiving unit can then be determined with high precision from the signal delay time of the individual position signals, in a way similar to that in the case of GPS.

Alternatively, however, it is also feasible for the receiving units to be designed to determine the reception angle of the respective position signals, and for the position determination unit to be designed to determine the location position of the transmitting and/or receiving unit which is fixed to the object, as a function of these reception angles. For example, the position of the receiving unit can be determined as the intersection point from the different reception angles of a plurality of position signals, using multiangulation. Furthermore, this system also makes it possible, however, to improve the accuracy of position determination with the aid of the signal delay time, and this can be used as a back-up.

In addition, it is feasible for the receiving units and the position determination unit to be designed to determine a Doppler shift from the position signals, thus allowing a relative velocity to be determined between the flying object and the ground station. For example, if at least three position signals are determined at three different receiving units, a three-dimensional velocity vector of the flying object can be determined from the Doppler shift of each position signal. Since the Doppler measurement can be carried out very quickly, direction changes can be detected very quickly. Furthermore, the received frequency change when flying over transmitting units provides very accurate marker information. The position of the flying object can advantageously be determined with high precision from the combination of the three measurement methods (range, angle, Doppler).

The stationary transmitting units which are arranged at the ground stations are advantageously connected to a control unit, which is designed for synchronous transmission of the position signals by means of the transmitting units. In this case, the signal delay times from the control unit, which is advantageously arranged in the tower, to the distant ground stations can be compensated for, since they are known in advance. The synchronization of the transmission of these position signals can therefore be considerably improved, thus improving the position determination accuracy. This is because, when using the signal delay time to determine position, it is of critical importance that the transmitting units transmit their position signal synchronously, such that the receiving unit can determine the signal delay time as accurately as possible.

In order to ensure fail-safety and to ensure safe operation, it is very particularly advantageous for the flight control system to be designed such that it can verify the operation of the transmitting and/or receiving unit which is stationary/fixed to the object. For this purpose, the receiving units which are stationary/fixed to the object are designed such that they likewise receive the position signals which are transmitted by the respective other transmitting units which are stationary/fixed to the object, and can therefore verify the operation of the individual transmitters as a function of these received position signals. For example, it is feasible for the position determination unit which is connected to the stationary receiving units to use these position signals transmitted by the stationary transmitting units to determine the position of the respective ground station, and to verify the operation of the flight control system on the basis of this location position of the ground station determined in this way, for example by comparing the determined location position with the known high-precision location position. Malfunctions or corresponding jamming transmitters with a criminal background can therefore be identified safely at an early stage. However, a check such as this can also be carried out using the transmitting and receiving units which are arranged on the flying object.

However, it is also feasible and particularly advantageous for the operation of the flight control system to be verified by comparing both the location positions determined by the flying object and the location positions determined by the airport (alternative 3). If major discrepancies occur in this case, then it is possible to derive from this that there is a malfunction of the system here, which must be reacted to as quickly as possible.

It is very particularly advantageous for the transmitting units to be designed to code information into the position signals, and for the receiving units to be designed to extract these position signals. Information can therefore be transmitted from the ground stations to the flying object, and vice versa, without additional radio systems having to be used for this purpose. For example, the determined location positions can be transmitted thus making it possible to carry out a comparison as described above. However, other information can also be transmitted, such as data relating to the airport itself with location positions of the stationary ground stations, the approach path (straight line or "curved"), or topographical data in the surrounding area of the airport.

The object of the present invention is also achieved by the method of the type mentioned initially, having the following steps:

transmission of position signals by means of a plurality of stationary transmitting units which are arranged on the ground, and reception of the position signals by means of at least one receiving unit which is arranged on the flying object and is fixed to the object, and/or transmission of position signals by means of at least one transmitting unit, which is arranged on the flying object, and reception of the position signals by means of a plurality of stationary receiving units which are arranged on the ground, determination of a location position of the transmitting and/or receiving unit which is fixed to the object, as a function of the received position signals, and flight assistance to the flying object as a function of the determined location position.

Advantageous refinements of the method according to the invention can be found in the dependent claims.

BRIEF DESCRIPTION OF THE DRAWINGS

The invention will be explained in more detail with reference, by way of example, to the attached drawings, in which.

DETAILED DESCRIPTION

Figure 1:
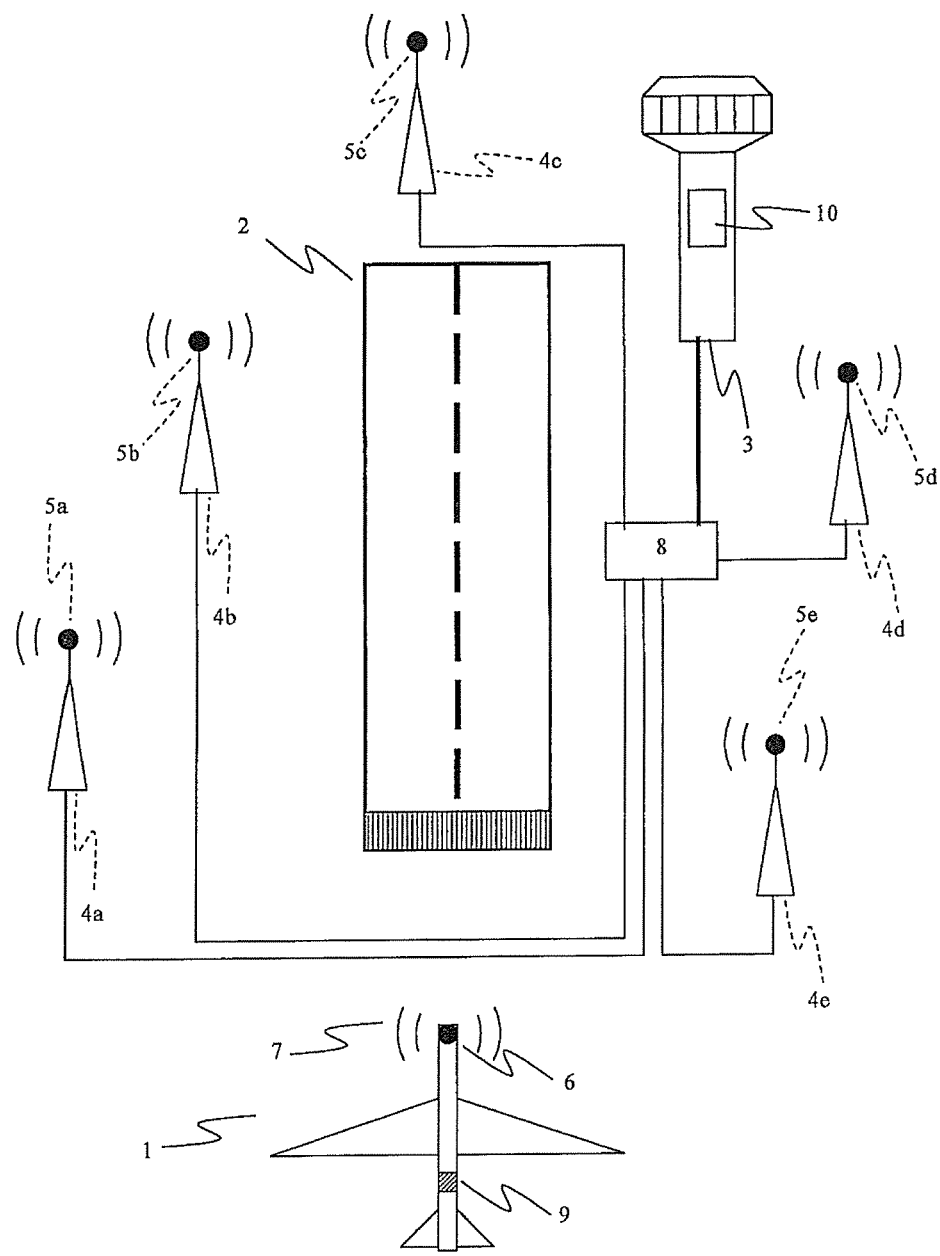
FIG. 1 shows a schematic illustration of a flight control system at an airport.

FIG. 1 schematically illustrates the flight control system according to the invention in conjunction with an airport. The corresponding flying object 1 is in this case actually on a landing approach to the runway 2. The range of the flight control system according to the invention is in this case limited to a radius of about 20 to 30 miles around the airport, as a result of which navigation is carried out by systems known from the prior art beyond this radius.

The control center 3, also referred to as the tower, of the airport is located in the vicinity of the runway 2, and is responsible for safe coordination of the approaches as far as landing. Furthermore, a series of ground stations 4a to 4e are arranged in the vicinity of the airport and of the runway 2, and are each equipped with appropriate transmitting and receiving units 5a to 5e. Since the ground stations 4a to 4e do not change and are stationary, the position of the individual ground stations 4a to 4e can be determined in advance with high precision, with these positions being available as a fixed reference variable throughout the entire system.

Furthermore, a transmitting and/or receiving unit 6 is likewise arranged on the aircraft 1 which wishes to land on the runway 2 of the airport, and is referred to as the transmitting and/or receiving unit 6 which is fixed to the object. Both the stationary transmitting and/or receiving units 5a to 5e and the transmitting and/or receiving unit 6 which is fixed to the object are in this case designed such that they can transmit appropriate position signals 7 with the aid of the transmitting units. For this purpose, the stationary transmitting and/or receiving units 5a to 5e are connected to a monitoring station 8, in order to allow the appropriate position signals 7 to be transmitted synchronously, which means that there is no longer any need to use extremely high-precision reference clocks.

In this case, five ground stations 4a to 4e are arranged in the present example, although only four ground stations would in each case be necessary from a mathematical point of view, in order to determine the position with high precision.

Furthermore, a position determination unit 9 is arranged on the aircraft 1, and is connected to the transmitting and/or receiving unit 6 which is fixed to the object. If the receiving unit 6 now receives the position signals 7 which have been transmitted by the stationary transmitting and/or receiving units 5a to 5e, then the position determination unit 9 can use the signal delay time of the individual signals to determine the range to the individual ground stations, from which the exact position of the flying object 1 can be determined, using the high-precision position of the individual ground stations, which is known, from the intersection points thereof.

In another advantageous alternative, this approach is also feasible in a different manner, in such a way that the transmitting and/or receiving unit 6 which is fixed to the object is designed in such a way that the flying object 1 transmits a position signal which can be received by the stationary receiving units 5a to 5e. Since the ground stations 4a to 4e are arranged at a distance from one another, the position signals which are transmitted by the transmitter unit 6 which is fixed to the object are received at different times by the respective transmitting and/or receiving units 5a to 5e. Each receiving unit 5a to 5e can therefore autonomously determine the signal delay time of the transmitted position signal 7 and, on the basis of their own high-precision positions, the position of the flying object 1 can then be determined, for example, by means of a position determination unit 10 which is arranged in the tower. In this case, this position determination unit 10 is connected to the receiving units 5a to 5e in the ground stations 4a to 4e.

If both the flying object 1 and the tower 3 determine the position of the flying object 1 at the same time, then it is very highly advantageous for the flight control system to be designed to match these two location positions, which have been determined independently of one another. It is then possible to use this comparison to determine the extent to which the flight control system is operating with high precision when it determines the position of the flying object 1, thus making it possible to verify operation. Communication means can be used for this purpose, in order to allow the aircraft and the tower to interchange the determined location positions with one another.

In this case, the particular advantage of a system such as this is that it is considerably less susceptible to interference than, for example, satellite navigation systems. Furthermore, the responsibility area can be clearly defined since, with a system such as this, the operator of the airport is now responsible for safety. Legal grey areas, such as those in the case of GPS, for example, are thus avoided.

Figure 2:
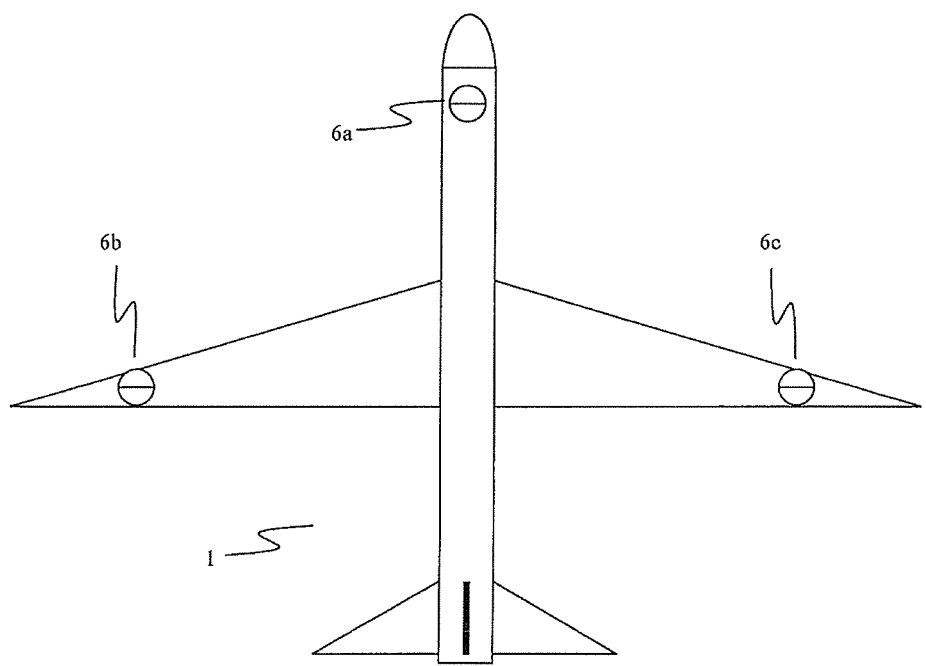
FIG. 2 shows transmitting and receiving antennas for determining the position and attitude of a flying object.

FIG. 2 shows an aircraft 1 which has a total of three transmitting and/or receiving units 6a to 6c at different positions on the aircraft 1. This arrangement of the transmitting and/or receiving units 6a to 6c at a distance from one another, and the relative position with respect to one another, makes it possible to determine the spatial attitude of the aircraft 1, when an accurate position within space is determined for each transmitting and/or receiving unit 6a to 6c. The attitude of the aircraft 1 in space can then be determined by linking these positions to form a corresponding plane. The spatial attitude of an aircraft with the components of pitch, roll angle and azimuth must in this case likewise be taken into account during the landing, in such a way that the flight control system can in this case provide assistance to the already existing attitude angle system.

The transmitting units advantageously transmit at a carrier frequency which is different from those of the satellite navigation systems, as a result of which these systems are not interfered with and can also still be used for assistance, or for emergencies.

The invention claimed is:

1. A flight control system for flight assistance of a flying object, comprising:
   a plurality of stationary ground stations, each of which includes a stationary unit for one or both of transmitting and receiving position signals;
   at least three mobile units fixed to the flying object and arranged at a distance from one another on the flying object, each mobile unit being configured for one or both of transmitting and receiving the position signals, wherein the at least three mobile units includes
      a first mobile unit being arranged on a left wing of the flying object,
      a second mobile unit being arranged on a right wing of the flying object, and
      a third mobile unit being arranged on a fuselage of the flying object; and
   at least one position determination unit which is connected to at least some of the stationary or mobile units,
   wherein the at least one position determination unit is configured to determine a position of each of the at least three mobile units as a function of the position signals, each of which was either
      transmitted by a stationary unit of the plurality of stationary ground stations and received by a mobile unit of the at least three mobile units, or
      transmitted by a mobile unit of the at least three mobile units and received by a stationary unit of the plurality of stationary ground stations,
   wherein the at least one position determination unit is configured to determine a spatial attitude of the flying object as a function of the positions of the at least three mobile units and their relative position with respect to each other, and
   wherein the flight control system is configured for flight assistance to the flying object as a function of the spatial attitude of the flying object,
   wherein the position determination unit is configured to determine the position of each of the at least three mobile units as a function of a signal delay time of the position signals between transmission and reception.

2. The flight control system according to claim 1, wherein the at least one position determination unit is configured to determine the position of each of the at least three mobile units as a function of a reception angle of the position signals.

3. The flight control system according to claim 1, wherein the at least one position determination unit is further configured to determine a relative velocity between at least one of the at least three mobile units and at least one of the stationary units as a function of a Doppler shift of received position signals, and to determine the position of each of the at least three mobile units as a function of the relative velocity.

4. The flight control system according to claim 1, further comprising
   a control unit for synchronous transmission of the position signals, wherein of the stationary units and the at least three mobile units, those which are configured to transmit are connected to the control unit.

5. The flight control system according to claim 1, wherein the at least one position determination unit is configured for verification of a method of operation of one of the stationary units or one of the at least three mobile units that is configured for transmitting, the verification being performed as a function of the received position signals.

6. The flight control system according to claim 1, wherein at least some of the stationary units are configured for receiving position signals and a first determination of the position of at least one of the at least three mobile units is made using the position signals received by the at least some of the stationary units, wherein the at least one of the at least three mobile units is configured for receiving position signals and a second determination of the position of the at least one of the at least three mobile units is made using the position signals received by the at least one of the at least three mobile units, and wherein the flight control system is configured for verification of a method of operation of the flight control system based on a comparison between the first determination and the second determination of the position of the at least one of the at least three mobile units.

7. The flight control system according to claim 1, wherein of the stationary units and the at least three mobile units, those which are configured to transmit are further configured to code information into the position signals, and wherein of the stationary units and the at least three mobile units, those which are configured to receive the position signals are further configured to extract the information which has been coded into the position signals.

8. A method for flight assistance of a flying object, comprising the following steps:

transmitting position signals with one or more of
 a plurality of stationary units which are arranged on the ground, and
 at least three mobile units fixed to the flying object and arranged at a distance from one another on the flying object, wherein the at least three mobile units includes
  a first mobile unit being arranged on a left wing of the flying object,
  a second mobile unit being arranged on a right wing of the flying object, and
  a third mobile unit being arranged on a fuselage of the flying object;
receiving the position signals with one or more of
 the at least three mobile units which are fixed to the flying object if the plurality of stationary units transmit the position signals, and
 the plurality of stationary units if the at least three mobile units transmit the position signals,
determining a position of each of the at least three mobile units as a function of the received position signals,
determining a spatial attitude of the flying object as a function of the positions of the at least three mobile units and their relative position with respect to each other,
assisting flight of the flying object as a function of the spatial attitude of the flying object, and
wherein the step of determining the position of each of the at least three mobile units is performed as a function of
a signal delay time of the position signals,
a reception angle of the position signals, and
at least one relative velocity determined on the basis of a Doppler shift between at least one of the at least three mobile units and one of the stationary units.

9. The method according to claim 8, further comprising a step of verifying a method of operation based on position signals transmitted by at least some of the stationary units and received by at least one of the stationary units.

10. The method according to claim 8, wherein the determining a position step includes making a first determination of the position of at least one of the at least three mobile units using position signals received by at least some of the stationary units and making a second determination of the position of the at least one of the at least three mobile units using position signals received by the at least one of the at least three mobile units, and further comprising a step of verifying a method of operation based on a comparison between the first determination and the second determination of the position of the at least one of the at least three mobile units.

11. A method for flight assistance of a flying object, comprising the following steps:

transmitting position signals with one or more of
 a plurality of stationary units which are arranged on the ground, and
 at least three mobile units fixed to the flying object and arranged at a distance from one another on the flying object, wherein the at least three mobile units includes
  a first mobile unit being arranged on a left wing of the flying object,
  a second mobile unit being arranged on a right wing of the flying object, and
  a third mobile unit being arranged on a fuselage of the flying object;
receiving the position signals with one or more of
 the at least three mobile units which are fixed to the flying object if the plurality of stationary units transmit the position signals, and
 the plurality of stationary units if the at least three mobile units transmit the position signals,
determining a position of each of the at least three mobile units as a function of the received position signals,
determining a spatial attitude of the flying object as a function of the positions of the at least three mobile units and their relative position with respect to each other,
assisting flight of the flying object as a function of the spatial attitude of the flying object, and
wherein the step of transmitting includes coding of information into the position signals and transmission of the position signals with the coded information, and wherein the step of receiving the position signals includes extraction of the coded information from the position signals.

* * * * *